Aug. 9, 1927.
C. H. SCHULTZ
THERMOMETER
Filed March 9, 1922
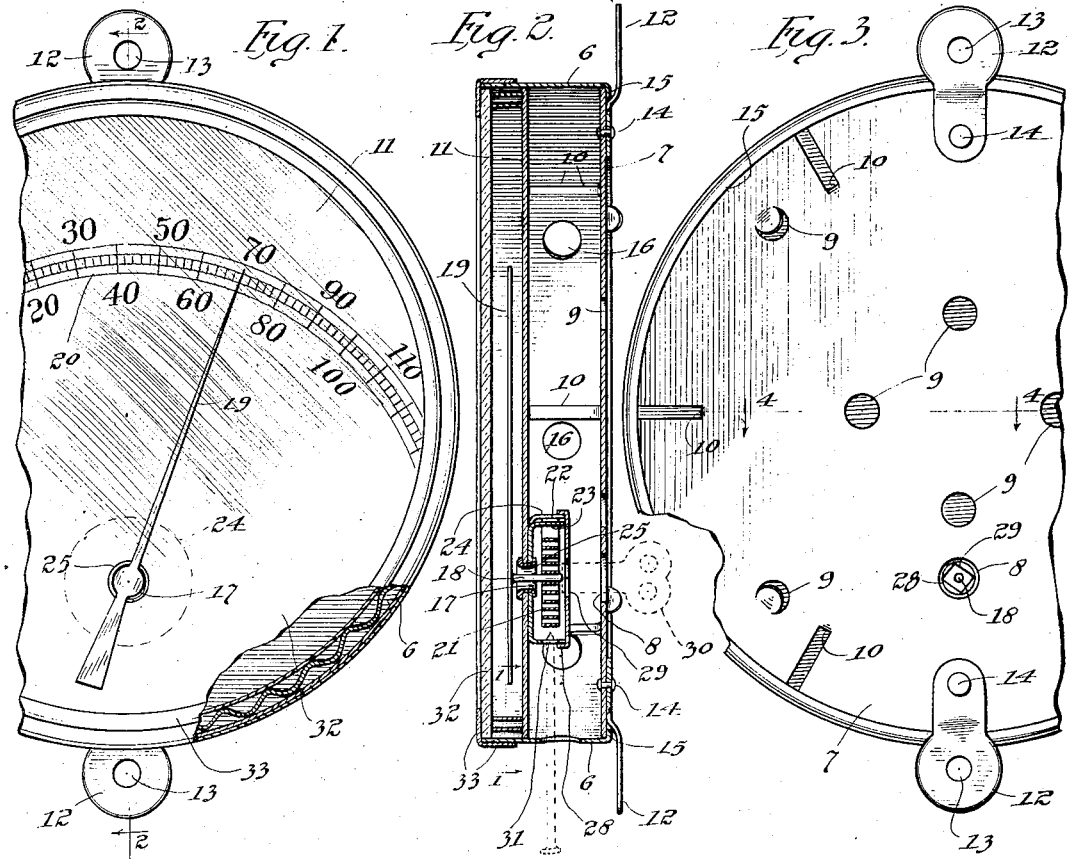
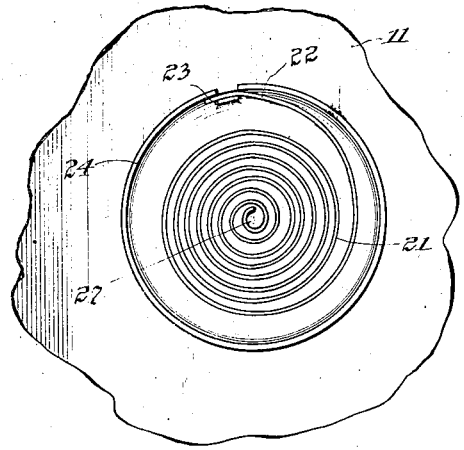
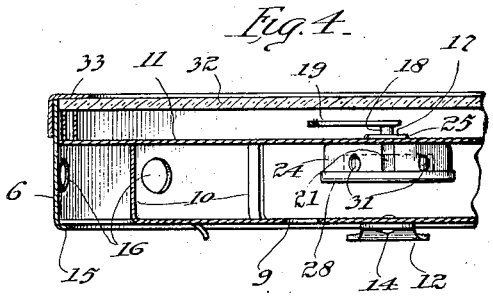
Inventor:
Charles H. Schultz
By Benjamin, Roosahouse + Lundy.
Attys.

Patented Aug. 9, 1927.

1,638,276

UNITED STATES PATENT OFFICE.

CHARLES H. SCHULTZ, OF CHICAGO, ILLINOIS.

THERMOMETER.

Application filed March 9, 1922. Serial No. 542,208.

My present invention relates to improvements in thermometers, and has special reference to the type of thermometers employing a thermo-sensitive element of a solid as distinguished from a fluid nature in association with an indicator hand, and a scale provided with indicia to show in terms of a temperature scale, such as the Fahrenheit or centigrade, the state of the thermo-sensitive element at the temperature indicated by the scale. Such a type of thermometer is not new with me, but, as far as I am aware, all prior thermometers of such a type have carried the indicating arm upon an arbor having bearings. So far as I am aware it has heretofore been an operation of considerable difficulty to set the indicating hand in re'ation to the scale so as to show the correct temperature, which is generally obtained from a good mercurial thermometer.

The objects of my invention are to so mount the thermo-sensitive element that the indicating arm may be secured to it without pivots or bearings, thereby simplifying the construction and doing away with the friction and other inconveniences of bearings, and, further, mounting the thermo-sensitive element and the attached indicating arm so that these elements may be readily moved with respect to the scale so that anyone, experienced or otherwise, may readily and correctly set the instrument by reference to a dependable thermometer. It will also be hereinafter seen that the arrangement I employ for mounting the thermo-sensitive e'ement and the indicator hand carried thereby affords ready facility for the adjustment of the thermo-sensitive element by bending so that it will be wholly free in its movements from contact and friction with the holder or container for the thermo-sensitive element and will permit the positioning or centering of the stud carrying the indicator hand substantially in the center of the convolute of the thermo-sensitive element, and also substantially of the aperture in the container or holder through which said stud passes. I prefer to attain the aforementioned objects by means of the structure illustrated in the accompanying drawings, in which Fig. 1 is a fragmental view, partially in section, of the front of a thermometer involving my invention.

Fig. 2 is a vertical central section of the structure shown in Fig. 1, taken on line 2—2, thereof.

Fig. 3 is a rear view of the structures shown in Figs. 1 and 2.

Fig. 4 is a detail section on line 4—4, Fig. 3.

Fig. 5 is an e'evation of the thermo-sensitive element and the housing therefor with the cap or cover removed.

The thermometer consists of a casing comprising a cylindrical body element 6 into one end of which is inserted a back 7 provided with an adjusting aperture 8 and air circulating apertures 9, and also has cut from its body adjacent its edges lateral strips 10 which are bent inwardly and are of sufficient length to serve as positioning elements for a dial plate 11. The back is also provided with tongues 12 perforated, as at 13, for suspending the instrument, which tongues may be secured to the back in any suitable manner, such as by rivets 14. The back is held in suitable relation with the element 6 by turning over the edges of the body element, as at 15. The body element is provided with perforations 16 to facilitate the circulation of air through the instrument and around the thermo-sensitive element. The dial plate 11 is perforated, at 17, for the passage of the pin 18 which holds the pointer or indicating arm 19, and with the center of this perforation 17 as a center suitable indicia 20 are provided upon the opposite portion of the dial in a circular path adjacent the end of the pointer or indicating arm.

The thermo-sensitive element consists of a ribbon 21 of suitable thermo-sensitive material formed into a convolute. The outer end 22 of this convolute is secured between an inwardly punched tang 23 and the side wall of a cylindrical container 24 which is of suitable depth or thickness to accommodate the ribbons or thermo-senstitive material without contacting the same at any point except at the point of attachment.

The central portion of the cylindrical container 24 is provided with a circular perforation through which it is secured to the hole in dial 11 by an eyelet 25 so applied as to produce friction between the container and the dial, but to permit of the rotation of the container with respect to the dial. The indicating arm 19, as before stated, is carried upon a pin 18 which extends through opening 17 in the dial and has frictional engagement with the innermost coil 27 of the thermo-sensitive element. A cover 28 fits frictionally and tightly over the cylindrical container 24, and in this cover is provided a central angular aperture 29 into which an angular instrument or key 30 is inserted to rotate the container and set the hand with respect to the scale. This key is most conveniently inserted through the key opening 8 in the back 7, but adjustment may also be secured by inserting a suitable instrument through apertures 16 in casing 6, the inner end of which instrument may be engaged with lateral openings 31 in the sides of the cylindrical container.

Mounted in front of the plate or dial 11 and suitably spaced therefrom and from the hand or pointer is a closure in the form of a glass disk 32, that is held in position by the usual bevel 33 to exclude dust and foreign matter from the front of the thermometer.

While I have illustrated and described a specific form of my invention it is obvious that changes may be made in the construction and arrangement of the parts without departing from the principles thereof, and I desire it understood that all such changes are fully contemplated within the scope of the appended claims.

What I claim is:—

1. A thermometer comprising an apertured disk having a scale concentric with said aperture, a centrally apertured container, an eyelet co-operating with the apertures in said disk and container for securing the same pivotally with relation to each other, a coiled thermo sensitive element within said container and secured at its outer end to the peripheral wall of said container, a pin secured to the inner end of said thermo sensitive element and extending through the aperture in said container, and a pointer secured to the outer end of said pin in co-operative relation with the scale on said disk.

2. A thermometer comprising an apertured plate, a scale therein concentric with said aperture, an arm movable with respect to said scale, a spindle upon which said arm is mounted and which is located in and movable axially with respect to the aperture in said plate, a cylindrical walled container mounted on said plate axially with respect to the aperture in the latter, and a thermo-sensitive element operatively connecting said container and said spindle and affording a support for said spindle and arm, said container adapted to be rotated whereby to adjust said arm with respect to said scale.

Signed at Chicago, county of Cook and State of Illinois, this 6th day of March, 1922.

CHARLES H. SCHULTZ.